(12) United States Patent
Kim

(10) Patent No.: US 12,147,193 B2
(45) Date of Patent: Nov. 19, 2024

(54) INLINE SCANNING HOLOGRAPHY SYSTEM FOR PHOSPHOR AND TRANSMITTER

(71) Applicant: CUBIXEL CO., LTD., Seoul (KR)

(72) Inventor: Tae Geun Kim, Seoul (KR)

(73) Assignee: Cubixel Co., Ltd., Seoul (KR)

( * ) Notice: Subject to any disclaimer, the term of this patent is extended or adjusted under 35 U.S.C. 154(b) by 341 days.

(21) Appl. No.: 17/642,251

(22) PCT Filed: Sep. 11, 2020

(86) PCT No.: PCT/KR2020/012293
§ 371 (c)(1),
(2) Date: Mar. 11, 2022

(87) PCT Pub. No.: WO2021/054680
PCT Pub. Date: Mar. 25, 2021

(65) Prior Publication Data
US 2022/0317625 A1    Oct. 6, 2022

(30) Foreign Application Priority Data
Sep. 16, 2019  (KR) .......................... 10-2019-0113621

(51) Int. Cl.
G03H 1/04    (2006.01)

(52) U.S. Cl.
CPC ... *G03H 1/0443* (2013.01); *G03H 2001/0447* (2013.01); *G03H 2001/0463* (2013.01);
(Continued)

(58) Field of Classification Search
CPC ... G03H 2001/0447; G03H 2001/0463; G03H 2222/36; G03H 2223/22; G03H 2223/24; G03H 2225/32; G03H 1/0443
(Continued)

(56) References Cited

U.S. PATENT DOCUMENTS

| | | | |
|---|---|---|---|
| 6,760,134 B1 * | 7/2004 | Schilling | .................. G03H 1/08 |
| | | | 359/9 |
| 2006/0214095 A1 * | 9/2006 | Nagasawa | .......... G02B 21/0012 |
| | | | 250/234 |

(Continued)

FOREIGN PATENT DOCUMENTS

| KR | 10-2010-0005866 A | 1/2010 |
|---|---|---|
| KR | 10-2013-0081127 A | 7/2013 |

(Continued)

OTHER PUBLICATIONS

International Search Report for PCT/KR2020/012293 mailed Dec. 1, 2020 from Korean Intellectual Property Office.
(Continued)

*Primary Examiner* — Audrey Y Chang
(74) *Attorney, Agent, or Firm* — Revolution IP, PLLC

(57) ABSTRACT

The present invention relates to an inline scanning holography system for a phosphor and a transmitter. According to the present invention, the inline scanning holography system includes a polarization sensitive lens that receives a linearly polarized beam and generates a first spherical wave of right-handed circular polarized light having a negative focal length and a second spherical wave of left-handed circular polarized light having a positive focal length, a polarizer that passes only a beam component in a predetermined polarization direction therethrough among components of the generated first and second spherical waves, a scanning unit for scanning a phosphor by using an interference beam generated between the first and second spherical waves passing through the polarizer, and a first photodetector that detects a fluorescent beam diverged from the phosphor. According to the present invention, a high-efficiency and high-quality optical scanning holography for a phosphor or a transmitter may be implemented.

8 Claims, 9 Drawing Sheets

(52) U.S. Cl.
CPC ..... *G03H 2222/36* (2013.01); *G03H 2223/22* (2013.01); *G03H 2223/24* (2013.01); *G03H 2225/32* (2013.01)

(58) Field of Classification Search
USPC .............................. 359/10, 22, 35; 356/457
See application file for complete search history.

(56) References Cited

U.S. PATENT DOCUMENTS

| | | | |
|---|---|---|---|
| 2015/0331167 A1* | 11/2015 | Escuti .................. | G02B 27/286 359/3 |
| 2019/0259796 A1 | 8/2019 | Cho et al. | |
| 2019/0346811 A1* | 11/2019 | Min ....................... | G03H 1/041 |

FOREIGN PATENT DOCUMENTS

| | | |
|---|---|---|
| KR | 10-2013-0083258 A | 7/2013 |
| KR | 10-2019-0099589 A | 8/2019 |
| KR | 10-2019-0099859 A | 8/2019 |

OTHER PUBLICATIONS

Zhu, Ziyi et al., "Self-interference polarization holographic imaging of a three-dimensional incoherent scene", Applied Physics Letters 109, AIP publishing. 2016, pp. 1-5.

* cited by examiner

INLINE SCANNING HOLOGRAPHY SYSTEM FOR PHOSPHOR AND TRANSMITTER

CROSS REFERENCE TO PRIOR APPLICATIONS

This application is a National Stage Application of PCT International Patent Application No. PCT/KR2020/012293 filed on Sep. 11, 2020, under 35 U.S.C. § 371, which claims priority to Korean Patent Application No. 10-2019-0113621 filed on Sep. 16, 2019, respectively, which are all hereby incorporated by reference in their entirety.

TECHNICAL FIELD

The present invention relates to an inline scanning holography system for a phosphor and a transmitter, and more particularly, to an inline scanning holography system that may implement a high-efficiency and high-quality optical scanning holography for a phosphor or a transmitter by using a polarization sensitive lens.

BACKGROUND

An optical scanning-based object hologram acquisition device of the related art forms a scanning beam pattern by using an interferometric structure that spatially separates coherent light (interferable light) into a first beam and a second beam, temporally and spatially modulates the first beam and the second beam traveling in each individual optical path on the individual optical path, and recombines the first beam and the second beam.

However, in the related art, in order to form a scanning pattern, an optical path difference between two separated optical paths has to be shorter than a coherence length of coherent light, and thus, a light source of high coherence is required, and a device with high precision and stability in a unit of wavelength of light is required.

In addition, a bulky optical system for separating and recombining light is required, and a complex electrooptical structure for temporally and spatially modulating each of first and second beams is required. Moreover, an electrooptical system having such a complex structure is very vulnerable to external environmental factors such as vibration, and thus, the system has a problem of poor stability.

The background of the present invention includes Korean Patent Publication No. 2013-0081127 (published on Jul. 16, 2013).

SUMMARY OF INVENTION

Technical Problem

An object of the present invention is to provide an inline scanning holography system capable of capturing a hologram of a transmitter or a phosphor by implementing a high-efficiency and high-quality optical scanning holography with high stability and low complexity by forming a scanning pattern in a single optical path by using a polarization sensitive lens.

Solution to Problem

The present invention provides an inline scanning holography system including a polarization sensitive lens configured to receive a linearly polarized beam and configured to generate a first spherical wave of right-handed circular polarized light having a negative focal length and a second spherical wave of left-handed circular polarized light having a positive focal length, a polarizer configured to pass only a beam component in a predetermined polarization direction therethrough among components of the generated first and second spherical waves, a scanning unit for scanning a phosphor that is a fluorescence object by using an interference beam generated between the first and second spherical waves passing through the polarizer, and a first photodetector configured to detect a fluorescent beam diverged from the phosphor.

In addition, the present invention provides an inline scanning holography system including a polarization sensitive lens configured to receive a linearly polarized beam and configured to generate a first spherical wave of right-handed circular polarized light having a negative focal length and a second spherical wave of left-handed circular polarized light having a positive focal length, a polarizer configured to pass only a beam component in a predetermined polarization direction therethrough among components of the generated first and second spherical waves, a scanning unit for scanning a transmitter that is a transmissive object by using an interference beam generated between the first and second spherical waves passing through the polarizer, and a first photodetector configured to detect a beam passing through the transmitter.

In addition, the inline scanning holography system may further include a light transmission means for transferring the fluorescent beam of the phosphor to the first photodetector.

In addition, the light transmission means may be a dichroic mirror, and the dichroic mirror may be disposed between the scanning unit and the phosphor, transmit the interference beam incident by the scanning unit therethrough and transfer the interference beam to the phosphor, and reflect the fluorescent beam incident from the phosphor and transfers the fluorescent beam to the first photodetector.

In addition, the light transmission means may be an optical filter, and the optical filter may be disposed at a front end of the first photodetector to transmit the fluorescent beam of the phosphor therethrough and transfer the fluorescent beam to the first photodetector without transmitting the interference beam therethrough.

In addition, the inline scanning holography system may further include a spatial filter disposed between the transmitter and the first photodetector to spatially filter the beam passing through the transmitter to obtain a phase distribution of the transmitter, wherein the spatial filter may include a Fourier lens located behind the transmitter, and a pin-hole located at a focal length of the Fourier lens.

In addition, the inline scanning holography system may further include a linear polarization direction converter located at a front end of the polarization sensitive lens, changing a polarization direction by phase-delaying a linearly polarized beam incident from the outside, and providing the linearly polarized beam to the polarization sensitive lens.

In addition, the linear polarization direction converter may include a variable wave plate to which a phase modulation signal with a phase delay value varying with time is applied and which phase-delays the incident linearly polarized beam according to the phase modulation signal to vary polarization, and a quarter-wave plate configured to change polarization of a beam passing through the variable wave plate.

In addition, the variable wave plate may be composed of a Pockels cell using an electrooptic effect for inducing a phase delay of a beam according to an electrical signal or a liquid crystal variable wave plate that changes a phase delay of a beam by changing a direction of a liquid crystal director according to an electrical signal.

In addition, the linear polarization direction converter may be composed of a full wave liquid crystal wave plate to which a phase modulation signal varying a phase delay value with time is applied and which varies polarization by phase-delaying the incident linearly polarized beam according to the phase modulation signal.

In addition, the linear polarization direction converter may include a light source-side polarizer configured to generate a linearly polarized beam from an inputted light, and a motor to which a phase modulation signal for varying a phase delay value with time is applied and which varies a polarization direction of the linearly polarized beam passing through the light source-side polarizer by rotating an angle of the light source-side polarizer according to the phase modulation signal.

In addition, the polarization sensitive lens may be composed of a geometric phase lens.

In addition, the inline scanning holography system may further include a signal generation unit configured to apply a phase modulation signal for varying a phase delay value with time to the linear polarization direction converter.

In addition, the phase modulation signal may be a periodic ramp signal with the phase delay value varying with time, and the interference beam may have a form of a heterodyne-modulated nonlinear Fresnel zone plate with time and is defined by a following equation, $$I_{fzp}(x_0, y_0; z) = \cos\left[\frac{2\pi f_{gp}}{\lambda(2f_{gp} + z)z}(x_0^2 + y_0^2) + 2\Omega_0 t\right]$$

where, $\lambda$ is a wavelength of a used beam, $f_{gp}$ is a focal length of the polarization sensitive lens, $(x_0^2+y_0^2)$ is a Catharsian coordinate system in which a plane orthogonal to an optical axis of the linearly polarized beam is set as $(x_0,y_0)$, z is a distance from a focal position of the second spherical wave to the object, and the periodic ramp signal according to time t has a slope of $\Omega_0$ and is represented as a function of $\Omega(t)=\Omega_0 t$ with a value between 0 and $\pi$.

In addition, the phase modulation signal may be a phase shift signal with the phase delay value discontinuously shifted in an order of $\{0, \pi/2, \pi\}$ according to time, and the interference beam may have a form of a heterodyne-modulated nonlinear Fresnel zone plate with time and is defined by a following equation, $$I(x_0, y_0; z) = \cos\left[\frac{2\pi f_{gp}}{\lambda(2f_{gp} + z)z}(x_0^2 + y_0^2) + p_n\right]$$

where, $\lambda$ is a wavelength of a used beam, $f_{gp}$ is a focal length of the polarization sensitive lens, $(x_0^2+y_0^2)$ is a Catharsian coordinate system in which a plane orthogonal to an optical axis of the linearly polarized beam is set as $(x_0,y_0)$, z is a distance from a focal position of the second spherical wave to the object, and $P_n$ is a set $(0, \pi/2, \pi)$ of n different phases used for phase shift.

In addition, the inline scanning holography system may further include a first lens located between the polarization sensitive lens and the scanning unit to adjust a distance between respective focal points of the first and second spherical waves and to image a pattern of a surface of the polarization sensitive lens as a surface of the object region, wherein the interference beam may have a form of a heterodyne-modulated nonlinear Fresnel zone plate with time and is defined by a following equation, $$I(x_0, y_0; z_{img}) = \cos\left[\frac{2\pi M_{img}^2 f_{gp}}{\lambda(2M_{img}^2 f_{gp} + z_{img})z_{img}}(M_{img}^2 x_0^2 + M_{img}^2 y_0^2) + 2\Omega_0 t\right]$$

or $$I(x_0, y_0; z_{img}) = \cos\left[\frac{2\pi M_{img}^2 f_{gp}}{\lambda(z_{img}^2 - M_{img}^4 f_{gp}^2)}(M_{img}^2 x_0^2 + M_{img}^2 y_0^2) + 2\Omega_0 t\right]$$

where, $M_{img}$ is a reduction ratio or an enlargement ratio of an image by the first lens when imaging a pattern of a surface of the polarization sensitive lens as a surface of the object region, and $z_{img}$ is a distance from a focal position of the second spherical wave to the object.

In addition, the inline scanning holography system may further include a second lens configured to locate between the polarization sensitive lens and the scanning unit and having the same focal position as the second spherical wave and converting the second spherical wave into a plane wave, wherein the interference beam may have a form of a heterodyne-modulated linear Fresnel zone plate formed by interference between the first spherical wave and the plane wave and is defined by a following equation, $$I(x_0, y_0; z) = \cos\left[\frac{\pi}{\lambda z}(x_0^2 + y_0^2) + 2\Omega_0 t\right]$$

where, z is a distance from a focal position of the first spherical wave to which a curvature is added by the second lens to the object.

In addition, the inline scanning holography system may further include an electronic processing unit configured to generate a hologram of the object by processing a signal detected by the first photodetector, wherein the signal generation unit may generate $\Omega(t)$ which is a periodic ramp signal according to time to apply the periodic ramp signal to the linear polarization direction converter and generate $\sin(2\Omega(t))$ which is a heterodyne reference signal to apply the heterodyne reference signal to a heterodyne detector included in the electronic processing unit.

In addition, the inline scanning holography system may further include a beam splitter located between the polarizer and the scanning unit to transmit, therethrough, part of a beam passing through the polarizer and transfer the part of the beam to the scanning unit and to reflect the rest of the beam, a second photodetector configured to detect the beam reflected by the beam splitter, and an electronic processing unit configured to generate a hologram of the object by processing a signal detected by the first photodetector, wherein the signal generation unit may generate $\Omega(t)$ which is a periodic ramp signal according to time and apply the periodic ramp signal to the linear polarization direction converter, and the second photodetector may generate $\sin(2\Omega(t))$, which is a heterodyne reference signal, based on the reflected beam and apply the heterodyne reference signal to a heterodyne detector included in the electronic processing unit.

In addition, the inline scanning holography system may further include an electronic processing unit configured to generate a hologram of the object by processing a signal detected by the first photodetector, wherein the electronic processing unit may include an AD converter configured to convert the detected signal into a digital signal, a signal processing unit configured to generate a complex hologram of the object from the converted digital signal, a storage unit configured to store the complex hologram, and a scan control unit configured to generate a control signal for changing a position of the scanning unit whenever hologram processing for a certain position of the object is completed.

Advantageous Effects of Invention

According to the present invention, a high-efficiency and high-quality optical scanning holography for a transmitter or a phosphor may be implemented by forming a scanning pattern in a single optical path by using a polarization sensitive lens, and in addition, there is an advantage in that the inline scanning holography system is robust and stable in an external environment by using an optical system structure with high stability and low complexity.

BEST MODE FOR INVENTION

Embodiments of the present invention will be described in detail with reference to the accompanying drawings such that those skilled in the art to which the present invention pertains may easily implement the embodiments.

The present invention relates to an inline scanning holography system for an object and proposes a holographic system of an inline scanning structure for obtaining a hologram of a fluorescence object (hereinafter, referred to as a phosphor) or a transmissive object (hereinafter, referred to as a transmitter).

Accordingly, in an embodiment of the present invention, an imaging object 10 may be largely divided into a phosphor 10-1 and a transmitter 10-2.

First, an inline scanning holography system for a phosphor will be described in detail with reference to FIGS. 1 to 7. The phosphor 10-1 may correspond to various objects with fluorescence.

Figure 1:
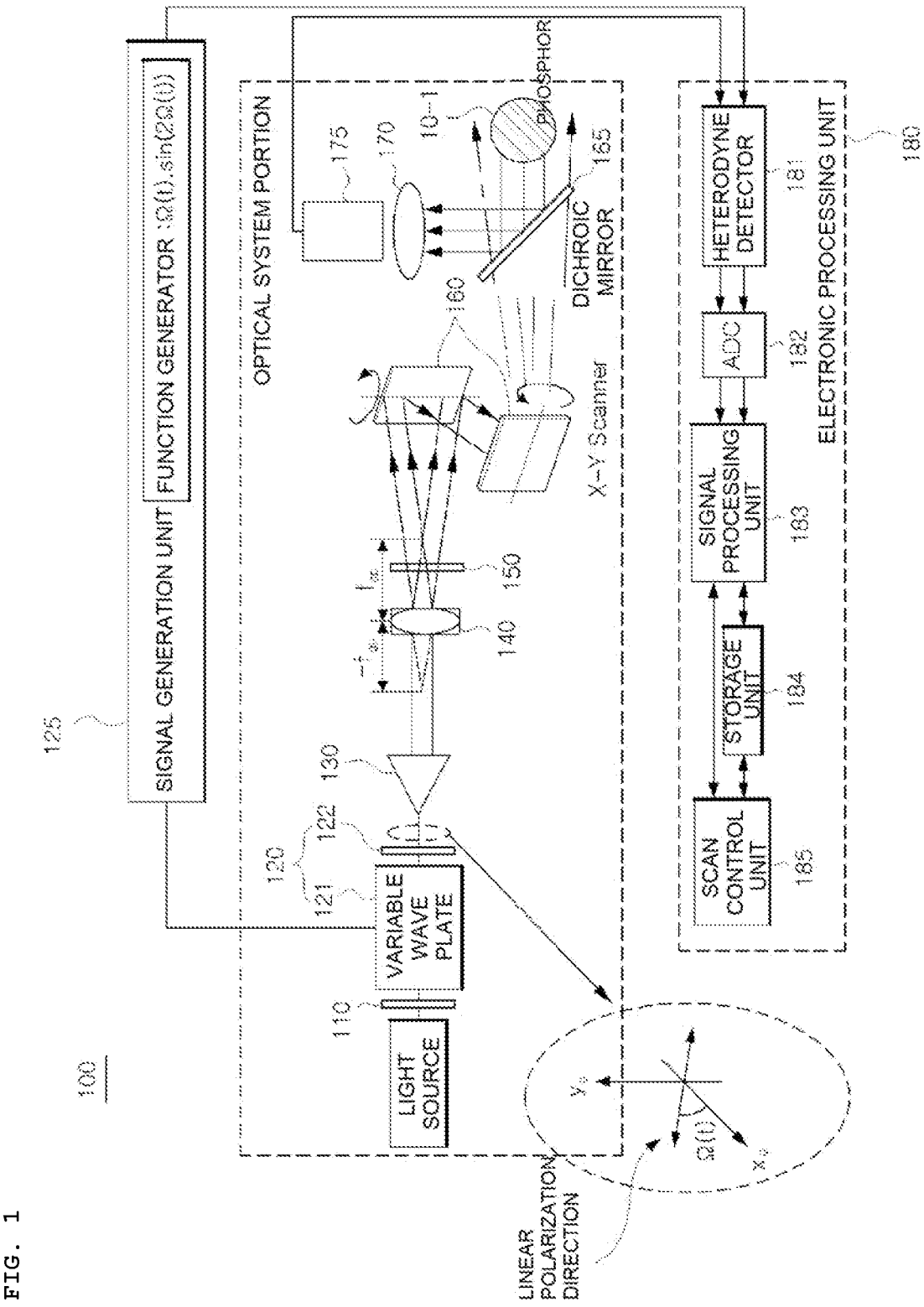
FIG. 1 illustrates a first embodiment of an inline scanning holography system according to the present invention.

FIG. 1 illustrates a first embodiment of an inline scanning holography system according to the present invention.

As illustrated in FIG. 1, an inline scanning holography system 100 according to a first embodiment includes a light source-side polarizer 110, a linear polarization direction converter 120, a signal generation unit 125, a collimator 130, a polarization sensitive lens 140, a polarizer 150, a scanning unit 160, a dichroic mirror 165, a first light collector 170, a first photodetector 175, and an electronic processing unit 180.

First, a light source generates electromagnetic waves. In the embodiment of the present invention, various means such as a laser generator for outputting coherent light, a light emitting diode (LED) lamp with low coherence, and a halogen lamp with a short coherence length may be used as the light source.

The light source-side polarizer (linear polarizer) 110 converts inputted light into linearly polarized beam and provides the linearly polarized beam to the linear polarization direction converter 120. In FIG. 1, the light source and the light source-side the polarizer 110 may be omitted, and in this case, externally generated linearly polarized beam may be directly inputted to the linear polarization direction converter 120. In addition, when the light source is omitted in FIG. 1, externally provided light may be directly inputted to the light source-side polarizer 110.

The linear polarization direction converter 120 phase-delays the linearly polarized beam incident from the light source-side polarizer 110 and changes a polarization direction of the light and provides the light to the polarization sensitive lens 140.

The linear polarization direction converter 120 may vary a phase delay of the linearly polarized beam with time based on a phase modulation signal received from the signal generation unit 125. The phase modulation signal varies a phase delay value according to time t and is generated by a function generator of the signal generation unit 125 and is represented as a function of $\Omega(t)$.

In the embodiment of the present invention, the linear polarization direction converter 120 may include a variable wave plate 121 and a quarter-wave plate 122. Each of the wave plates is an optical element for changing a polarization state of light and is called a phase retarder.

The variable wave plate 121 varies polarization with time by phase-retarding the incident linearly polarized beam according to a phase modulation signal of the signal generation unit 125. In addition, the quarter-wave plate 122 changes polarization of the light passing through the variable wave plate 121. The quarter-wave plate 122 transfers the linearly polarized beam, whose polarization direction is rotated by applying a phase delay of $\lambda/4$ to the incident beam, to the collimator 130.

In this way, the variable wave plate 121 changes polarization of the linearly polarized beam received from the light source-side polarizer 110 according to a signal of a function generator and transfers the linearly polarized beam to the quarter-wave plate 122, and the quarter-wave plate 122 outputs the linearly polarized beam whose polarization direction is rotated. Here, the function generator may generate a phase delay of the variable wave plate 121 such that a direction of the light outputted from the quarter-wave plate 122 varies to $\Omega(t)$ with time with respect to an $x_0$ axis.

In the embodiment of the present invention, the variable wave plate 121 may include a Pockels cell using an electric-optic effect for inducing a phase delay of light according to an electrical signal, and a liquid crystal variable wave plate that varies a phase delay of light by changing a direction of a liquid crystal director according to an electrical signal. Of course, various means for that may change polarization of light according to an electrical signal may be used for the variable wave plate 121.

Accordingly, although the linear polarization direction converter 120 includes the variable wave plate 121 and the quarter-wave plate 122 in FIG. 1, the present invention is not limited thereto.

For example, when a full wave liquid crystal wave plate is used as the variable wave plate 121, the linear polarization direction converter 120 may be configured without the quarter-wave plate 122. In addition, when a bandwidth of a light source is wide, in order to rotate a polarization direction of light without wavelength dependence in a wide wavelength region, the variable wave plate 121 and the quarter-wave plate 122 illustrated in FIG. 1 are removed, and the light source-side polarizer 110 is mechanically rotated by using a motor or the like, and thereby, the polarization direction may be rotated.

To this end, the linear polarization direction converter 120 may include the light source-side polarizer 110 and a motor (not illustrated). In this case, the light source-side polarizer 110 generates a linearly polarized beam by receiving a light source with a random polarization. In this case, the motor rotates an angle of the light source-side polarizer 110 according to a phase modulation signal of the signal generation unit 125, and thus, the polarization direction of the linearly polarized beam passing through the light source-side polarizer 110 is changed and transferred to the collimator 130. In this case, the same effect as before may be obtained.

In FIG. 1, for the sake of convenient description, a linearly polarized beam is formed by the light source-side polarizer 110, the variable wave plate 121 phase-delays the incident linearly polarized beam to change polarization and transfers the linearly polarized beam, and the quarter-wave plate 122 generates a linearly polarized beam whose polarization direction is rotated but also changes a direction of the linearly polarized beam through various combinations using a half-wave plate, a quarter-wave plate, a polarizer, and a variable wave plate. That is, the linear polarization direction converter 120 may be implemented by various means for changing a polarization direction of a linearly polarized beam by phase-delaying the linearly polarized beam.

The collimator 130 may expand a beam outputted from the linear polarization direction converter 120 and transfers the beam to the polarization sensitive lens 140 and may be implemented by various means for expanding the beam.

The polarization sensitive lens 140 receives an expanded linearly polarized beam after passing through the linear polarization direction converter 120 and simultaneously generate a first spherical wave of right-handed circular polarized light with a negative focal length and a second spherical wave of left-handed circular polarized light having a positive focal length.

Here, the polarization sensitive lens 140 may be configured by a geometric phase lens. The geometric phase lens 140 has a thin plate-type structure with Pancharatnam-phase effect based on liquid crystal and serves as a lens that changes a wavefront of an inputted beam according to polarization of the inputted light into a wavefront having positive and negative focal lengths. The geometric phase lens may be made by using an analog hologram recording device based on a Mach-Zehnder interferometer as is known, and a ready-made lens provided by ImagineOptix may be used therefor.

Figure 2:
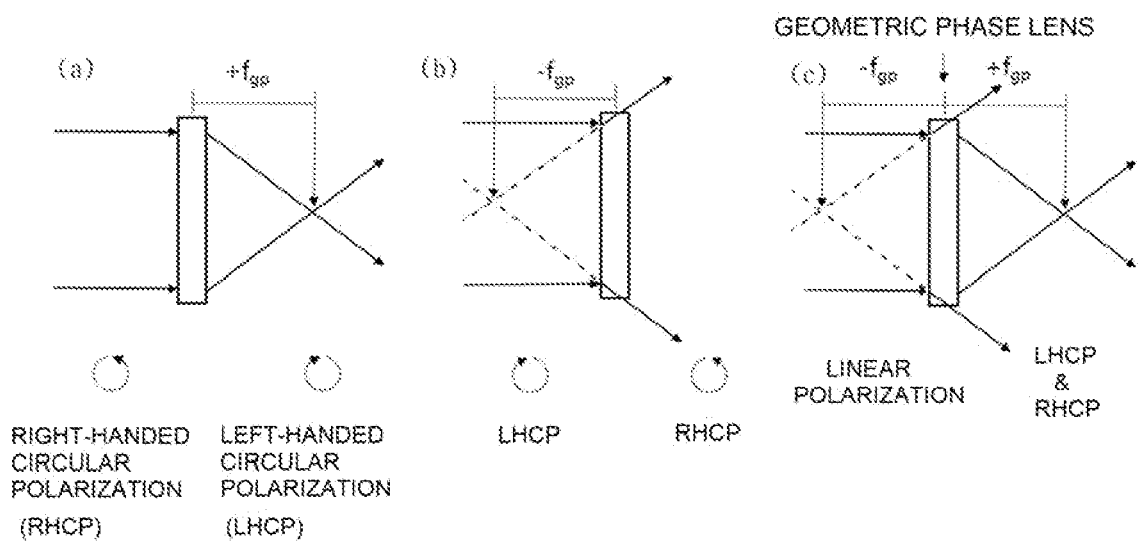
FIG. 2 is a diagram illustrating a principle of a polarization sensitive lens according to an embodiment of the present invention.

FIG. 2 illustrates a principle of a polarization sensitive lens according to an embodiment of the present invention.

The geometric phase lens 140 generates a spherical wave of a left-handed circular polarized beam with a positive focal length $+f_{gp}$ by acting as a convex lens in response to a corresponding polarization direction, when a right-handed circular polarized beam is incident, as illustrated in (a) of FIG. 2, and generates a spherical wave of a right-handed circular polarized beam with a negative focal length $-f_{gp}$ by acting as a concave lens in response to a corresponding polarization direction, when a left-handed circular polarized beam is incident, as illustrated in (b) of FIG. 2.

However, in the embodiment of the present invention, as illustrated in (c) of FIG. 2, a linearly polarized wavefront is inputted to the geometric phase lens 140, and in this case, the geometric phase lens 140 divides energy intensity of the inputted light by almost half and simultaneously generates a wavefront of a spherical wave (hereinafter, a first spherical wave) of right-handed circular polarized beam with the negative focal length $-f_{gp}$ and a wavefront of a spherical wave (hereinafter, a second spherical wave) of left-handed circular polarized beam with the positive focal length $+f_{gp}$.

In this way, the geometric phase lens 140 forms a first spherical wave that places a focal point on an opposite side to a travel direction of the incident beam by changing a part of the incident linearly polarized beam into a right-handed circular polarized beam, and at the same time, forms a second spherical wave that places a focal point toward the travel direction of the incident beam by changing converts the remainder into left-handed circular polarized beam.

As such, in the embodiment of the present invention, a scanning pattern is formed in a single optical path by using a polarization sensitive lens, and thus, it is possible to realize high-efficiency and high-quality optical scanning holography compared to the known technique in which a light source is separated into two paths and then recombined to form an interference pattern, and also, there is an advantage in that the optical scanning holography is robust and stable to an external environment by using an optical system structure with high stability and low complexity.

The first and second spherical waves derived inline by the polarization sensitive lens 140 are transferred to the polarizer 150 (linear polarizer).

The polarizer 150 (linear polarizer) passes only a beam component in a certain polarization direction among components of the first and second spherical waves transferred from the geometric phase lens 140. That is, the polarizer 150 passes therethrough only the polarized beam corresponding to a predetermined polarization direction of the polarizer 150 and transfers the polarized beam to the scanning unit 160.

The scanning unit 160 scans the phosphor 10-1 which is an imaging object 10 by using an interference beam (an interference pattern) generated between the first and second spherical waves passing through the polarizer 150. In the present embodiment, the scanning unit 160 uses a mirror scanner.

The mirror scanner is composed of an X-Y scanner including a horizontal scan mirror that scans the object 10 in the X direction and a vertical scan mirror that scans the object 10 in the Y direction. Of course, in the present invention, the scanning unit 160 is not limited to a mirror scanner, and a similar means or another known scanning unit may be used therefor.

The scanning unit 160 operates by receiving a scan control signal from the scan control unit 185, and the scan control unit 185 generates a scan control signal for controlling a scan position of the scanning unit 160. Here, the scan control signal may include a horizontal scan signal and a vertical scan signal for respectively controlling the horizontal scan mirror and the vertical scan mirror in a horizontal direction and a vertical direction.

The dichroic mirror 165 is a light transfer means and transfers a fluorescent beam diverged from the phosphor 10-1 to the first photodetector 175 in the process of scanning the phosphor 10-1. As described above, the embodiment of the present invention includes a light transfer means for transferring a fluorescent beam of the phosphor 10-1 to the first photodetector 175 when an object is the phosphor 10-1.

In FIG. 1, the dichroic mirror 165 is disposed to be inclined at a set angle between the scanning unit 160 and the phosphor 10-1.

The dichroic mirror 165 is designed to selectively reflect light according to a wavelength, and in the present embodiment, the dichroic mirror 165 is designed to transmit an interference beam therethrough and to reflect a fluorescence beam.

That is, the dichroic mirror 165 illustrated in FIG. 1 transmits an interference beam incident by the scanning unit 160 therethrough and transfers the interference beam to the phosphor 10-1, reflects a fluorescent beam incident from the phosphor 10-1, and transfers the fluorescent beam to the first photodetector 175.

As described above, the dichroic mirror 165 transmits a wavelength of an interference beam therethrough and reflects a wavelength of a beam fluoresced by the phosphor 10-1. Here, of course, a wavelength of the interference beam and a wavelength of the fluorescent beam correspond to values previously known.

Accordingly, an interference beam (an interference pattern) for scanning the phosphor 10-1 passes through the dichroic mirror 165 to be transferred to the phosphor 10-1. In addition, a fluorescent beam diverged from the phosphor 10-1 during scanning is reflected immediately upon reaching the dichroic mirror 165 and transferred to the first photodetector 175 through the first light collector 170.

Of course, in the embodiment of the present invention, the light transfer means is not limited to the dichroic mirror 165 and may be replaced with an optical filter 166 illustrated in FIG. 3 described below.

Figure 3:
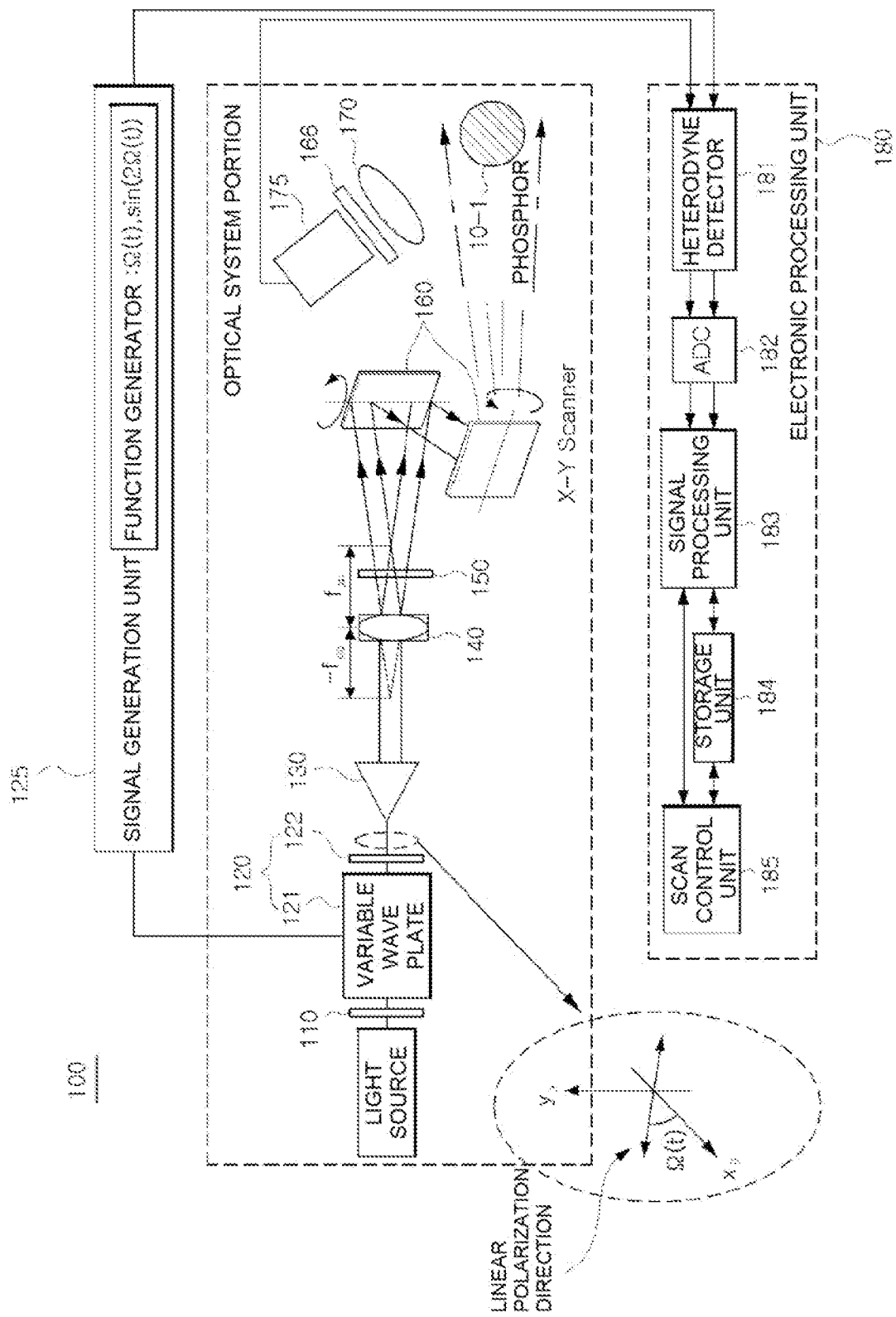
FIG. 3 illustrates a modification example of FIG. 1.

FIG. 3 illustrates a modification example of FIG. 1. As illustrated in FIG. 3, the optical filter 166 is disposed in front of the first photodetector 175. The optical filter 166 transmits a beam fluoresced by the phosphor 10-1 therethrough and transfers the beam to the first photodetector 175 but does not transmit an interference beam therethrough.

In addition, in the structure of FIG. 3, an interference beam (an interference pattern) generated between the first and second spherical waves is directly transferred to the phosphor 10-1 through the scanning unit 160, and a fluorescent beam diverged from the phosphor 10-1 during scanning is transferred to the first photodetector 175 through the optical filter 166.

That is, the beam fluoresced by the phosphor 10-1 is spatially integrated by the first light collector 170, filtered by the optical filter 166, and transferred to the first photodetector 175. In this case, the optical filter 166 preferably transmits a wavelength fluoresced by the phosphor 10-1 therethrough.

Here, although the optical filter 166 is placed between the first light collector 170 and the first photodetector 175 for the sake of convenient description, the optical filter 166 may also be disposed anywhere in an optical path between the phosphor 10-1 and the first photodetector 175.

In FIG. 1, a phase modulation signal of the signal generation unit 125 is a periodic ramp signal whose phase delay value linearly varies with time and is represented as a function of $\Omega(t)$. Here, the signal generation unit 125 generates two functions, that is, $\Omega(t)$ and $\sin(2\Omega(t))$ and transfers the periodic ramp signal $\Omega(t)$ to the linear polarization direction converter 120 and transfers a heterodyne reference signal $\sin(2\Omega(t))$ to the heterodyne detector 181 of the electronic processing unit 180.

Figure 4:
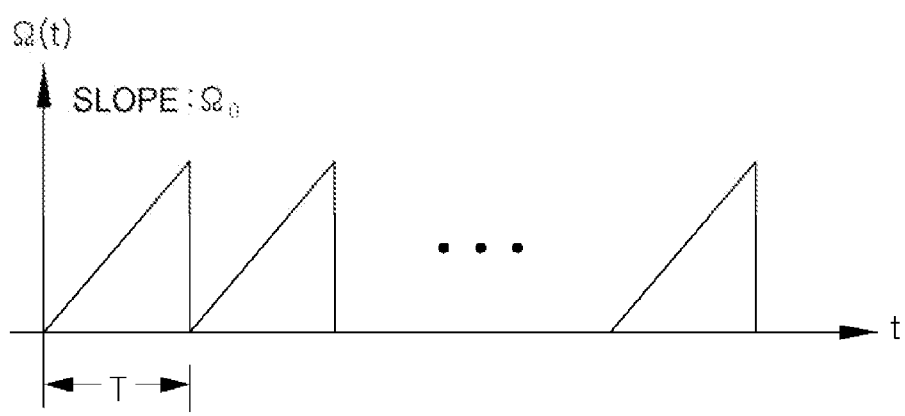
FIG. 4 is a diagram illustrating a periodic ramp signal generated by a signal generation unit of FIG. 1.

FIG. 4 is a diagram illustrating a periodic ramp signal generated by the signal generation unit of FIG. 1.

As illustrated in FIG. 4, the signal generation unit 125 generates the periodic ramp signal $\Omega(t)$ that varies according to time t with a set period T. The periodic ramp signal $\Omega(t)$ according to the time t has a slope of $\Omega_0$ and may be represented as a function of $\Omega(t)=\Omega_0 \cdot t$ having a value between 0 and $\pi$.

That is, the function generator of the signal generation unit 125 generates the periodic ramp signal $\Omega(t)$ that causes $2\Omega(t)$ to change linearly from 0 to $2\pi$ with time and applies the periodic ramp signal $\Omega(t)$ to the variable wave plate 121.

As such, when the phase modulation signal applied to the variable wave plate 121 is a periodic ramp signal, an interference beam due to two spherical waves has a nonlinear Fresnel zone plate shape that is heterodyne-modulated with time and is represented by Equation 1 below.

$$I_{fzp}(x_0, y_0; z) = \cos\left[\frac{2\pi f_{gp}}{\lambda(2f_{gp}+z)z}(x_0^2 + y_0^2) + 2\Omega_0 t\right] \quad \text{Equation 1}$$

Here, $\lambda$ is a wavelength of a used beam, $f_{gp}$ is a focal length of the polarization sensitive lens 140, $(x_0^2+y_0^2)$ is a Catharsian coordinate system in which a plane orthogonal to an optical axis of the linearly polarized beam is set as $(x_0,y_0)$, z is a distance from a focal position of the second spherical wave to the object 10, and $\Omega_0$ is a slope of a $\Omega(t)$ function.

The first photodetector 175 detects a beam fluoresced by the object 10, that is, the phosphor 10-1. the beam fluoresced by the object 10 at a scan position of a scan beam designated by the scanning unit 160 is spatially integrated by the first light collector 170.

Of course, in FIG. 1, the beam fluoresced by the object is reflected by the dichroic mirror 165 and spatially integrated by the first light collector 170, and in FIG. 3, the beam fluoresced by the object 10 is spatially integrated by a first light collector 170 through the optical filter 166.

Here, the first light collector 170 may be implemented by a lens and may also be implemented by various known light collecting means such as an imaging or non-imaging light collector including a concave reflector.

The first photodetector 175 detects the spatially integrated beam through the first light collector 170 and converts the spatially integrated beam into a current signal. In this case, the first photodetector 175 generates a current according to intensity of the spatially integrated beam. The first photodetector 175 may be implemented by using a photodiode but is not limited thereto, and various photodetector means such as a photo-multiplier tube may be applied thereto. In addition, light transferred to a detection surface of the first photodetector 175 may be directly detected without the first light collector 170.

The electronic processing unit 180 generates a hologram of the object 10 by processing a signal detected by the first photodetector 175. The electronic processing unit 180 may include a heterodyne detector 181, an analog to digital (AD) converter 182, a signal processing unit 183, a storage unit 184, and a scan control unit 185.

The heterodyne detector 181 generates an in-phase output signal and a quadrature-phase output signal by processing a current signal received from the first photodetector 175.

The heterodyne detector 181 generates an in-phase signal as a first output by using the received current signal and a modulation signal sin(2Ω(t)) generated by a function generator of the signal generation unit 125 and generates a quadrature-phase signal as a second output. An in-phase output signal and a quadrature-phase output signal correspond to a pattern in which a three-dimensional image of an object is encoded by a non-linear Fresnel zone plate.

The AD converter 182 has two input channels to receive an in-phase signal and a quadrature-phase signal through the two channels and converts the signals into digital signals. The converted digital signals are provided to the signal processing unit 183 together with a scan position of the scanning unit 160.

The signal processing unit 183 generates a complex hologram of the object 10 from the digital signal, and the storage unit 184 stores the generated complex hologram. In addition, the scan control unit 185 generates a control signal for changing the scan position of the scanning unit 160 whenever hologram processing for a certain position of the object 10 is completed and transfers the control signal to the scanning unit 160.

Although heterodyne detection is performed before conversion to a digital signal is performed by the AD converter 182 in the first embodiment of the present invention illustrated in FIG. 1, a current signal provided by the first photodetector 175 and a signal generated by the signal generation unit 125 may be converted into digital signals by the AD converter 182 and then transferred to the signal processing unit 183, and the signal processing unit 183 may perform digital heterodyne detection by using a digital signal processing method. In this case, a configuration of the heterodyne detector 181 is not required.

Figure 5:
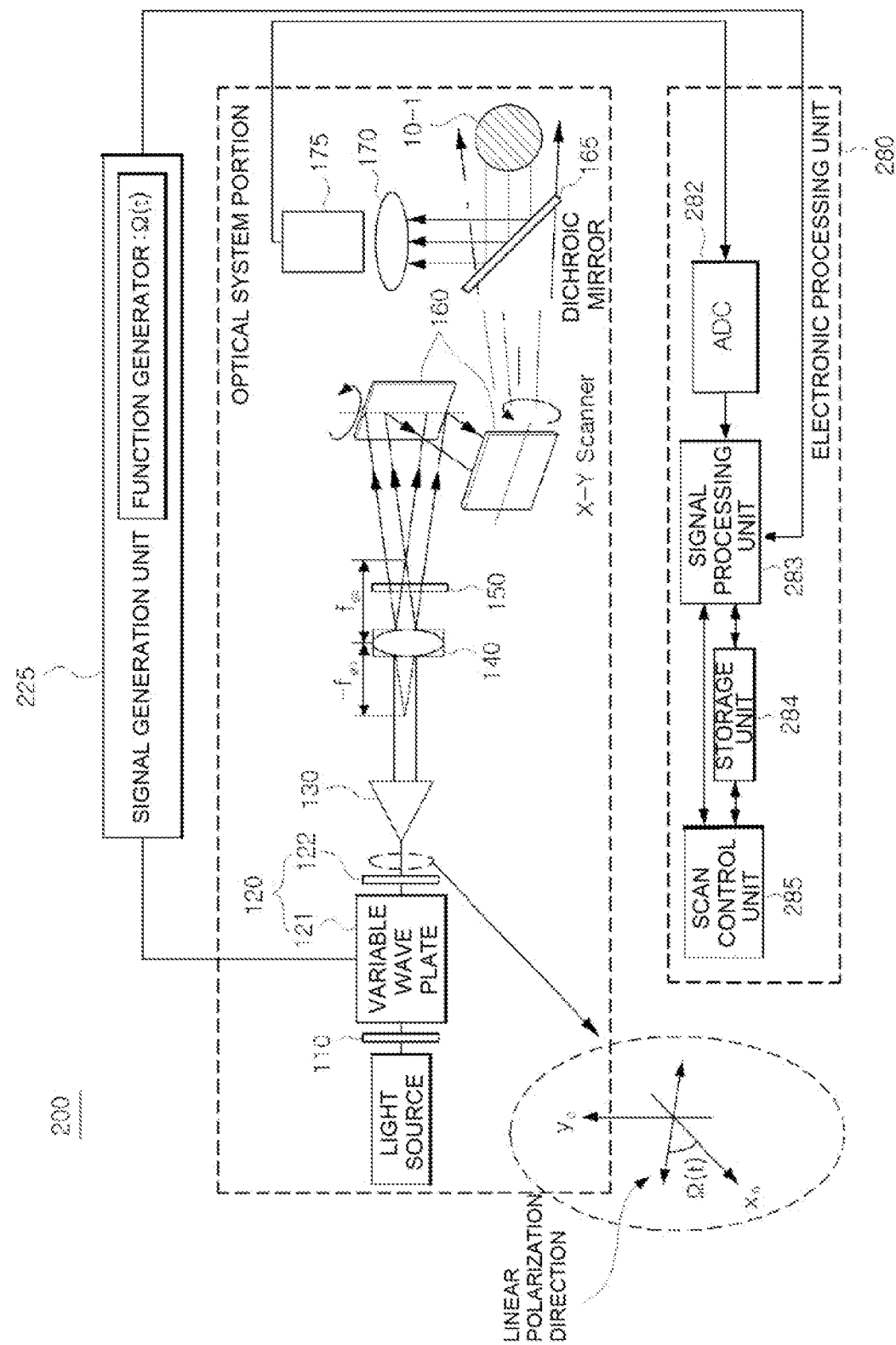
FIG. 5 illustrates a second embodiment of the inline scanning holography system according to the present invention.

FIG. 5 illustrates a second embodiment of the inline scanning holography system according to the present invention.

As illustrated in FIG. 5, an inline scanning holography system 200 according to the second embodiment includes a light source-side polarizer 110, a linear polarization direction converter 120, a signal generation unit 225, a collimator 130, a polarization sensitive lens 140, a polarizer 150, a scanning unit 160, a dichroic mirror 165, a first light collector 170, a first photodetector 175, and an electronic processing unit 280.

In FIG. 5, components denoted by the same reference numerals as in the first embodiment of FIG. 1 indicate that the same operations are performed thereby, and thus, redundant descriptions of the components denoted by the same reference numerals are omitted.

In FIG. 5, unlike FIG. 1, a phase modulation signal generated by the signal generation unit 225 corresponds to a phase shift signal with a phase delay value discontinuously shifted in the order of 0, π/2, and π according to time. Accordingly, a function generator of the signal generation unit 225 generates a phase shift signal Ω(t) so as to be shifted in the order of 0, π/2, and π, and applies the phase shift signal Ω(t) to the variable wave plate 121.

In this case, an interference beam may have a nonlinear Fresnel zone plate shape that is heterodyne-modulated with time and may be defined by Equation 2 below.

$$I(x_0, y_0; z) = \cos\left[\frac{2\pi f_{gp}}{\lambda(2f_{gp}+z)z}(x_0^2 + y_0^2) + p_n\right] \quad \text{Equation 2}$$

Here, λ is a wavelength of a used beam, $f_{gp}$ is a focal length of the polarization sensitive lens 140, $(x_0^2+y_0^2)$ is a Catharsian coordinate system in which a plane orthogonal to an optical axis of the linearly polarized beam is set as $(x_0, y_0)$, z is a distance from a focal position of the second spherical wave to an object, and $P_n$ is a set (0, π/2, π) of n different phases used for phase shift.

In FIG. 5, the signal generation unit 225 may generate only the periodic ramp signal Ω(t), and the electronic processing unit 280 does not need to include the heterodyne detector 181 and may detect a hologram signal having a phase shifted by a digital signal processing method.

The AD converter 282 of the electronic processing unit 280 converts a signal detected by the first photodetector 175 into a digital signal and detects the hologram signal having the phase shifted by the digital signal processing method. The signal processing unit 283 generates a complex hologram of the object 10 from the phase-shifted hologram signal, and the storage unit 184 stores the complex hologram. The scan control unit 284 generates a control signal for changing a position of the scanning unit 160 whenever hologram processing on a certain position of the object 10 is completed.

Configurations of the signal generation unit 225 and the electronic processing unit 280 may be applied in the same principle to the system of FIG. 3 as well.

Figure 6:
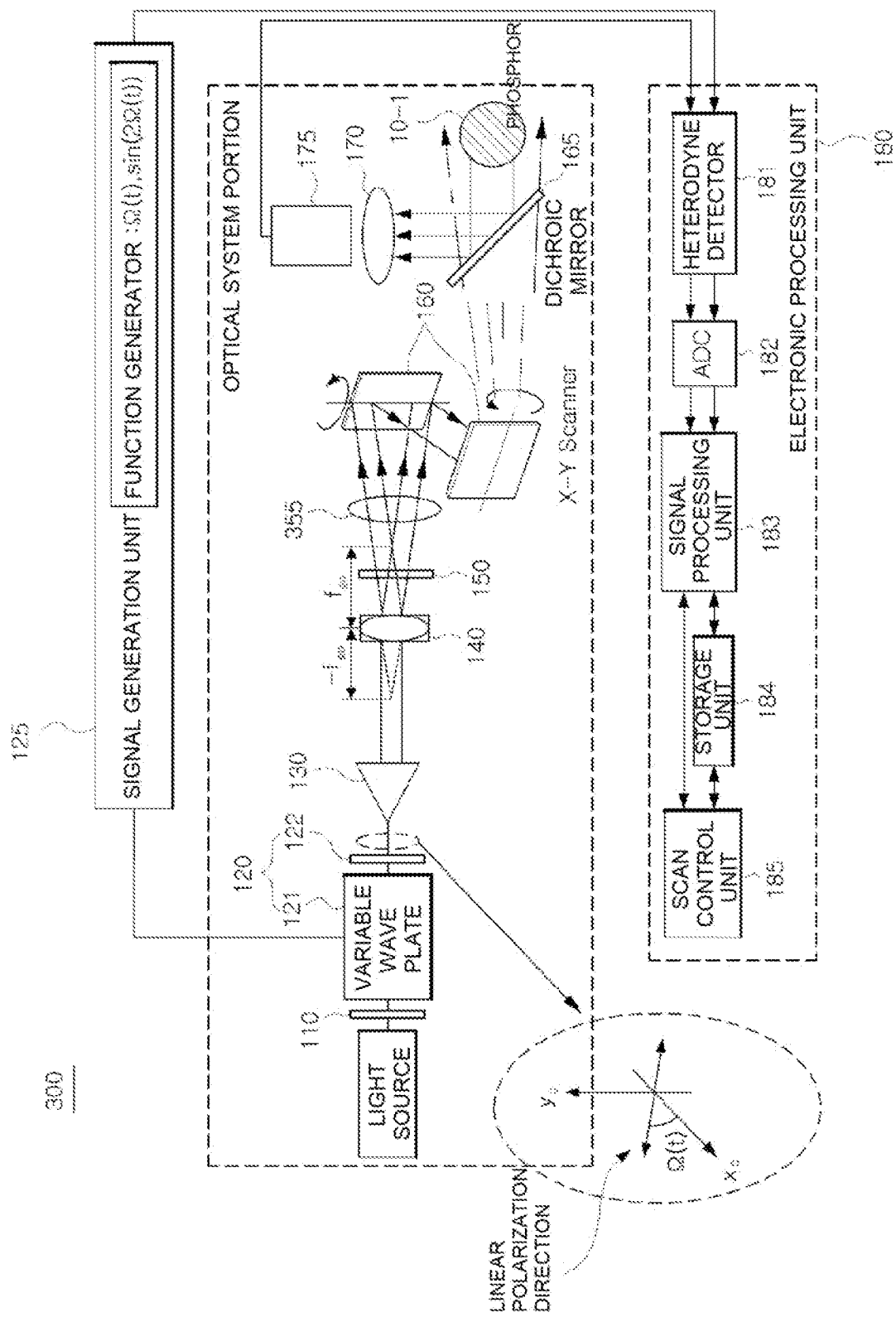
FIG. 6 illustrates a third embodiment of the inline scanning holography system according to the present invention.

FIG. 6 illustrates a third embodiment of the inline scanning holography system according to the present invention.

As illustrated in FIG. 6, an inline scanning holography system 300 according to the third embodiment includes a light source-side polarizer 110, a linear polarization direction converter 120, a signal generation unit 125, a collimator 130, a polarization sensitive lens 140, a polarizer 150, a first lens 355, a scanning unit 160, a dichroic mirror 165, a first light collector 170, a first photodetector 175, and an electronic processing unit 180.

FIG. 6 illustrates that the first lens 355 is additionally inserted in the structure of the first embodiment of FIG. 1, and redundant descriptions of the components denoted by the same reference numerals are omitted.

In FIG. 6, the first lens 355 is placed between the polarization sensitive lens 140 and the scanning unit 160 to adjust a distance between respective focal points of the first and second spherical waves and serves as an imaging lens for imaging a pattern of a surface of a polarization sensitive lens as a surface of an object region.

That is, when a surface of a geometric phase lens is imaged on the object region in a manner of being enlarged or reduced by the first lens 355, a pattern on surface of the geometric phase lens may be imaged and projected on the object.

When a focal position of the first spherical wave is referred to as f1 and a focal position of the second spherical wave is referred to as f2, a distance between f1 and f2 in FIG. 1 is $2f_{gp}$, but a distance between the f1 and f2 in FIG. 6 is changed to $2M^2_{img}f_{gp}$ according to a reduction ratio or an enlargement ratio of the first lens 355.

In addition, in FIG. 6, an interference beam has a non-linear Fresnel zone plate shape that is heterodyne-modulated with time and is represented by Equation 3 below.

$$I(x_0, y_0; z_{img}) = \cos\left[\frac{2\pi M_{img}^2 f_{gp}}{\lambda(2M_{img}^2 f_{gp} + z_{img})z_{img}}(M_{img}^2 x_0^2 + M_{img}^2 y_0^2) + 2\Omega_0 t\right]$$ Equation 3

Here, $M_{img}$ is a reduction ratio or an enlargement ratio of an image by the first lens 355 when imaging a pattern of a polarization sensitive lens (geometric phase lens) surface as a surface of an object region, $z_{img}$ is a distance from a focal position of the second spherical wave to an object, and $2M^2_{img}f_{gp}$ is a distance between focal points of the adjusted first and second spherical waves.

As described above, new first and second spherical waves may be placed on a surface of an object by placing the first lens 355 between the polarization sensitive lens 140 and the object 10 and by changing a distance between focal points of two spherical waves by using an enlargement or reduction method.

Although the embodiments of the present invention described above exemplify that an object (a target object) is placed in a region from which two spherical waves are diverged, an object may be placed between focal points (a position between f1 and f2) of the two spherical waves by using a method of increasing resolution in microscopy application of a heterodyne scan-based hologram.

To this end, a hologram of an object encoded by an interference pattern of inverse curvatures of a diverging spherical wave and a converging spherical wave may be obtained by using a method of placing an imaging lens between a polarization sensitive lens (a geometric phase lens) and an object, placing a focal position f1 of the first spherical wave in front of the object, and placing a focal position f2 of the second spherical wave in the rear of the object, and thus, resolution may be increased by numerically restoring the hologram.

For example, a hologram encoded by an interference pattern of a converging first spherical wave and a diverging second spherical wave may be obtained by placing an imaging lens between a geometric phase lens and an object and imaging a surface of a geometric phase lens onto a surface of an object, and in this case, the interference pattern may be defined by Equation 4 below.

$$I(x_0, y_0, z_{img}) = \cos\left[\frac{2\pi M_{img}^2 f_{gp}}{\lambda(z_{img}^2 - M_{img}^4 f_{gp}^2)}(M_{img}^2 x_0^2 + M_{img}^2 y_0^2) + 2\Omega_0 t\right]$$ Equation 4

Here, $M_{img}$ is a reduction ratio or an enlargement ratio of an image by an imaging lens when a pattern of a polarization sensitive lens (geometric phase lens) surface is imaged on a surface of an object, and $z_{img}$ is a distance from a focal point of the second spherical wave to an object.

In addition, in the embodiment of the present invention, a second lens (not illustrated) is placed between the polarization sensitive lens 140 and the scanning unit 160 to form an interference pattern between a plane wave and a spherical wave.

In general, an optical scan holography may obtain a hologram of an object by scanning the object with a linear Fresnel zone plate in which a spherical wave and a plane wave interfere with each other. When a lens is placed between the geometric phase lens and the object, an interference pattern of the plane wave and the spherical wave may be formed. Therefore, it is possible to obtain a hologram encoded by a linear Fresnel zone plate, which is an interference pattern formed by interference between a spherical wave and a plane wave.

This is described below in detail. In this case, it is assumed that a second lens is disposed instead of a first lens at a position of a numerical number 355 of FIG. 6 for the sake of convenient description.

The second lens (not illustrated) is disposed between the polarization sensitive lens 140 and the scanning unit 160 to form a focal point at the same focal point f2 as in the second spherical wave. As described above, when a focal position of the second lens (not illustrated) is the same as a focal position of the second spherical wave, the second spherical wave is converted into a plane wave, and a curvature of a spherical wave is added to the first spherical wave by the second lens.

In this case, an interference beam has a linear Fresnel zone plate shape formed by interference between the first spherical wave and the plane wave and may be defined by Equation 5 below.

$$I(x_0, y_0; z) = \cos\left[\frac{\pi}{\lambda z}(x_0^2 + y_0^2) + 2\Omega_0 t\right]$$ Equation 5

Here, z is a distance from a focal position of the first spherical wave to which a curvature is added by the second lens to an object.

In this way, when a second lens is inserted such that a focal position of the second lens is the same as a focal position of a second spherical wave, a hologram encoded by the linear Fresnel zone plate that is an interference pattern between a spherical wave and a plane wave may be obtained.

A configuration of the lens (the first lens or the second lens) described above may also be applied to the system of FIG. 3 in the same principle.

Meanwhile, the above-described embodiments of the present invention exemplify that a geometric phase lens is used as a polarization sensitive lens, but various lenses having different focal lengths according to polarization, such as a polarization sensitive transmission liquid crystal graded index (GRIN) lens formed of liquid crystal, may be used therefor.

Specifically, a polarization sensitive transmission liquid crystal GRIN lens, which is composed of liquid crystal aligned in a p-polarization direction and refracts p-polarized light and transmits s-polarized light therethrough, may be aligned and placed in an x direction of a Cartesian coordinate system, a quarter-wave plate may be inserted between the polarization sensitive transmission liquid crystal GRIN lens and the polarizer 150. In this case, light outputted from a light source is linearly polarized by the light source-side polarizer 110 and transferred to the variable wave plate 121, and a linearly polarized beam whose polarization direction is changed by the variable wave plate 121 is expanded by the collimator 130 and then passes through the polarization sensitive transmission liquid crystal GRIN lens to form a spherical wave for a portion corresponding to the p-polarization direction and form a plane wave for a portion corresponding to the s-polarization direction. In this case, the spherical wave of the p-polarization portion and the plane wave of the s-polarization portion are respectively converted into right-handed circular polarized light and left-handed circular polarized light by a quarter-wave plate inserted between the polarization sensitive transmission liquid crystal GRIN lens and the polarizer 150, the converted beam passes through the polarizer 150 to form a linear Fresnel zone plate that is an interference pattern formed by interference between the plane wave and the spherical wave as represented by Equation 5.

In addition, although it is described that a lens (a first or second lens) is inserted between a geometric phase lens and an object for the sake of convenient description in order to form a Fresnel zone plate having an inverse curvature of a nonlinear Fresnel zone plate of Equation 3 to Equation 5, it is needless to say that Equation 3 to Equation 5 may be formed by inserting and placing a lens between the collimator 130 and the polarization sensitive lens 140.

Figure 7:
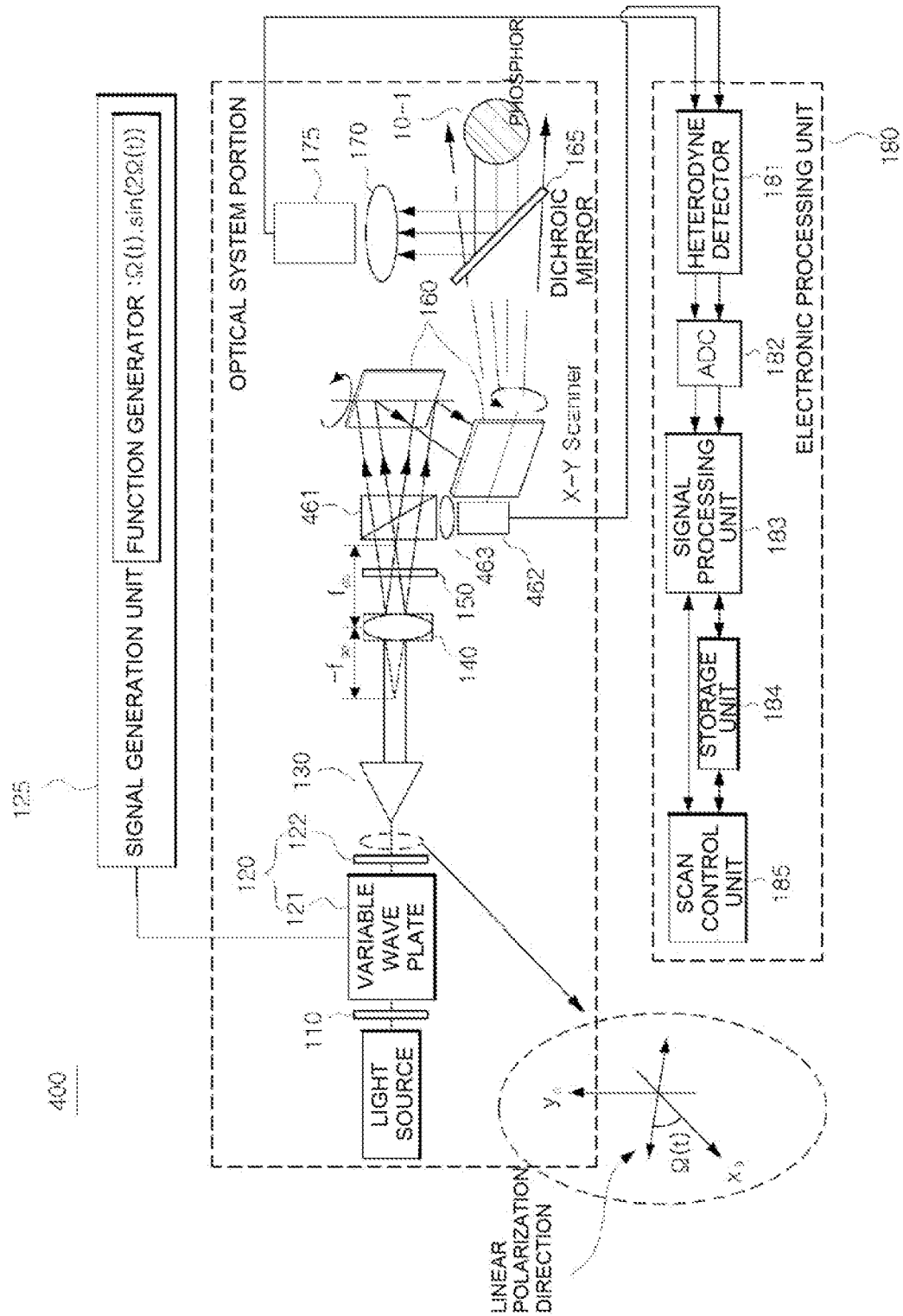
FIG. 7 illustrates a fourth embodiment of the inline scanning holography system according to the present invention.

In addition, although a function generator generates the modulation signal $\Omega(t)$ of the variable wave plate 121 and transfers the modulation signal to the variable wave plate 121 and generates the heterodyne reference signal $\sin(2\Omega(t))$ and transfers the heterodyne reference signal to the heterodyne detector 181 in the first and third embodiments illustrated in FIGS. 1 and 6, the heterodyne reference signal may be generated by a beam splitter and a second photodetector illustrated in FIG. 7 and described below.

FIG. 7 illustrates a fourth embodiment of the inline scanning holography system according to the present invention.

As illustrated in FIG. 7, an inline scanning holography system 400 according to the fourth embodiment includes a light source-side polarizer 110, a linear polarization direction converter 120, a signal generation unit 125, a collimator 130, a polarization sensitive lens 140, a polarizer 150, a scanning unit 160, a dichroic mirror 165, a first light collector 170, a first photodetector 175, a beam splitter 461, a second photodetector 462, a second light collector 463, and an electronic processing unit 180.

FIG. 7 corresponds to a case in which the beam splitter 461 and the second photodetector 462 are added to the configuration of FIG. 1. The beam splitter 461 is provided between the polarizer 150 and the scanning unit 160 to transmit, therethrough, a part of a beam passing through the polarizer 150 and transfer the part of the beam to the scanning unit 160 and reflect the rest of the beam.

The second photodetector 462 is placed on a path of the beam reflected by the beam splitter 461 and detects the beam reflected from the beam splitter 461. Of course, the beam reflected from the beam splitter 461 is spatially integrated by the second light collector 463 and then, detected by the second photodetector 462.

The second photodetector 462 detects the reflected beam to generate a beating signal $\sin(2\Omega(t))$ based thereon. It can be seen that the beating signal is the same as the heterodyne reference signal used above. Accordingly, the second photodetector 462 may input the beating signal to the heterodyne detector 181 as a reference signal.

In the fourth embodiment, the signal generation unit 125 generates a periodic ramp signal $\Omega(t)$ and applies the periodic ramp signal $\Omega(t)$ to the linear polarization direction converter 120, and the second photodetector 462 applies the heterodyne reference signal $\sin(2\Omega(t))$ generated based on the reflected beam to the heterodyne detector 181 of the electronic processing unit 180.

The first to fourth embodiments described above exemplify that the object 10 is the phosphor 10-1. As such, when the object 10 is the phosphor 10-1, the fluorescent light of the object 10 is integrated by using the first light collector 170 and transferred to the first photodetector 175, and the first photodetector 175 may record a hologram of a phosphor by detecting the spatially integrated beam through the first light collector 170.

In this case, a dichroic mirror or an optical filter that reflects or filters light corresponding to a wavelength of the fluorescent light from the object 10 and transfers the light to the first photodetector 175 may be placed between the first photodetector 175 and the object 10 to reduce optical noise.

Hereinafter, a holography system for a case in which the object 10 is a transmissive object, that is, a transmitter 10-2 is described in detail with reference to FIGS. 8 and 9. The transmitter 10-2 may correspond to various objects with transmittance, such as cells, microorganisms, membranes, transparent objects, or sculptures.

Figure 8:
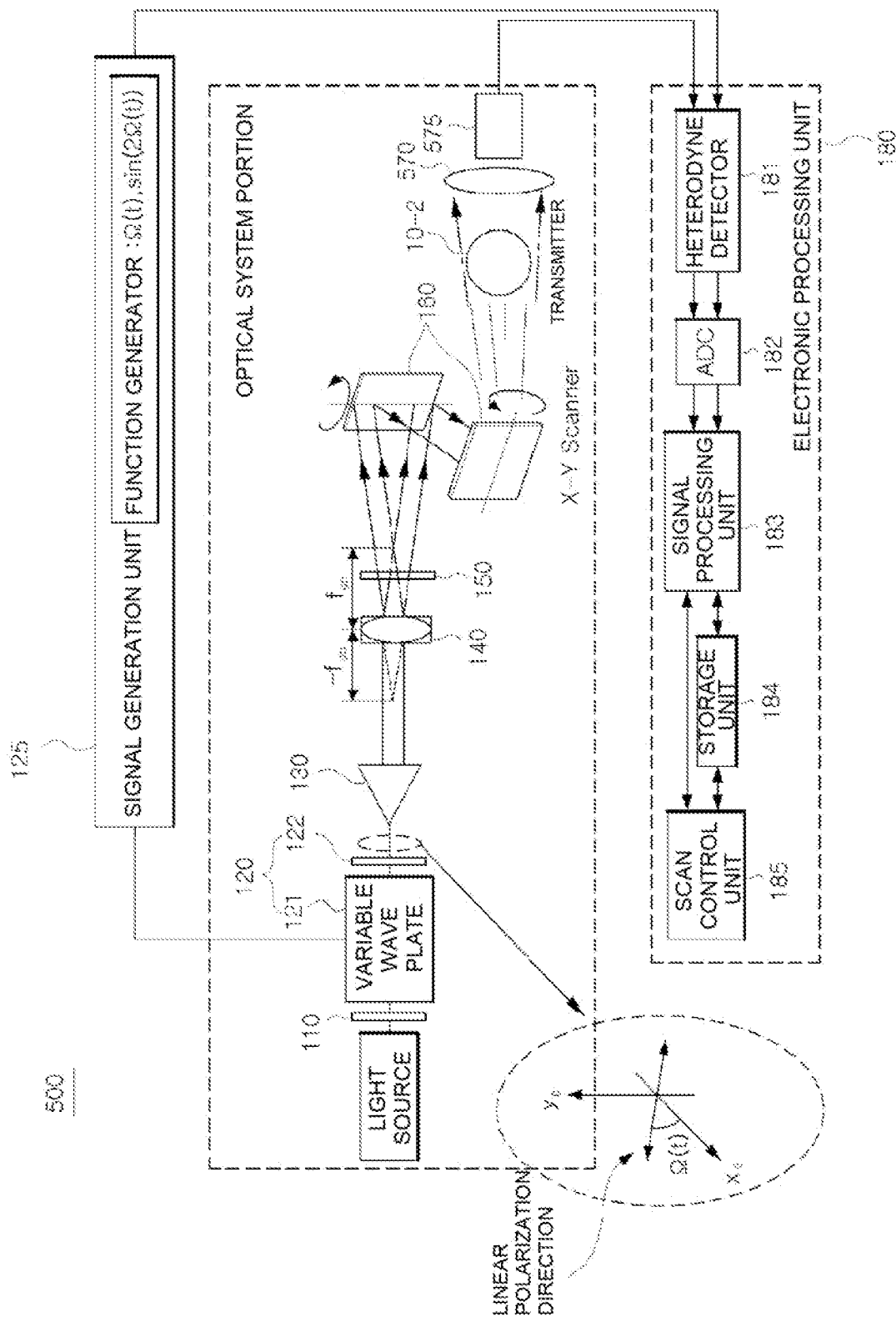
FIG. 8 illustrates a fifth embodiment of the inline scanning holography system according to the present invention.

FIG. 8 illustrates a fifth embodiment of the inline scanning holography system according to the present invention.

As illustrated in FIG. 8, an inline scanning holography system 500 according to the fifth embodiment includes a light source-side polarizer 110, a linear polarization direction converter 120, a signal generation unit 125, a collimator 130, a polarization sensitive lens 140, a polarizer 150, a scanning unit 160, a first light collector 570, a first photodetector 575, and an electronic processing unit 180.

In FIG. 8, components denoted by the same reference numerals as in the first embodiment of FIG. 1 indicate that the same operations are performed thereby, and thus, redundant descriptions of the components denoted by the same reference numerals are omitted.

In FIG. 8, an object 10 corresponds to a transmitter 10-2 unlike FIG. 1, and thus, the first photodetector 575 detects a beam passing through the transmitter 10-2 from an optical path (behind the transmitter) passing through the transmitter 10-2.

That is, in FIG. 8, the scanning unit 160 scans the transmitter 10-2 that is the object 10 by using an interference beam (an interference pattern) generated between a first spherical wave and a second spherical wave passing through the second polarizer 150. In this case, a beam passing through the transmitter 10-2 is spatially integrated by the first light collector 570 and transferred to the first photodetector 575.

In addition, the electronic processing unit 180 processes the signal detected by the first photodetector 575 to generate a hologram of the transmitter 10-2 that is a transmissive object. A drive principle of the electronic processing unit 180 is described above, and thus, redundant descriptions thereof are omitted.

Here, the signal generation unit 225 and the electronic processing unit 280 of FIG. 5 may also be used instead of the signal generation unit 125 and the electronic processing unit 180 of FIG. 8. In addition, in the system of FIG. 8, a first lens or a second lens may be disposed at the same position as the reference numeral 355 of FIG. 6.

In addition, configurations of the beam splitter 461, the second light detector 462, and the second light collector 463 described above with reference to FIG. 7 may be added to the system of FIG. 8.

As illustrated in FIG. 8, when the object 10 is the transmitter 10-2 that transmits light therethrough, the first light collector 570 and a first photodetector 575 may be placed on a path of light passing through the object 10 to integrate the light passing through the object 10 by using the first light collector 570 and transfer the integrated light to the first photodetector 575, and the first photodetector 575 detects the spatially integrated beam through the first light collector 570, resulting in recording of a hologram of the transmitter 10-2.

Figure 9:
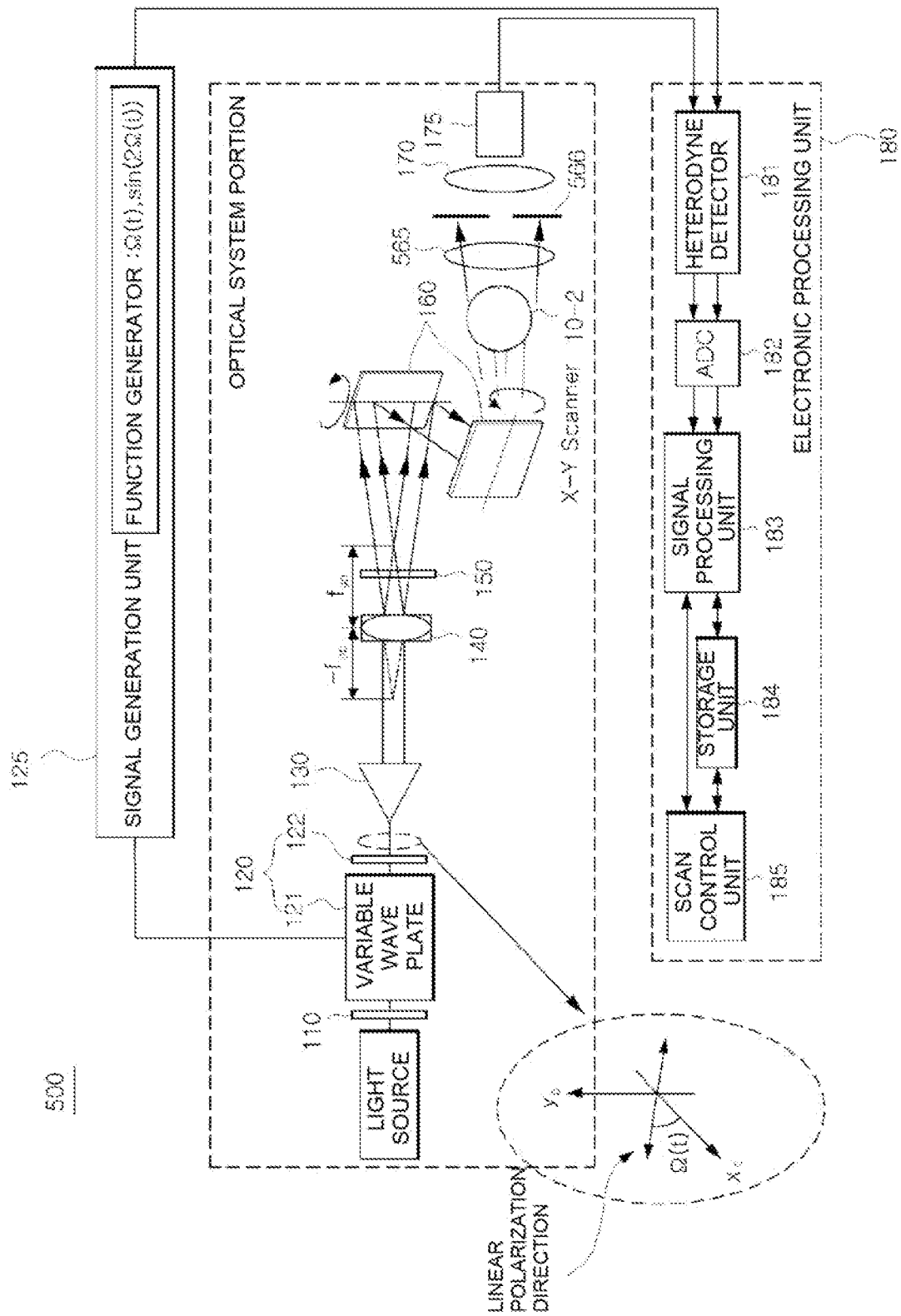
FIG. 9 illustrates a modification example of FIG. 8.

FIG. 9 illustrates a modification example of FIG. 8. In FIG. 9, a spatial filter is placed between a transmitter 10-2 and the first photodetector 575 to obtain a phase image not a light intensity image for the transmitter 10-2.

The spatial filter includes a Fourier lens 565 and a pin-hole 566. The Fourier lens 565 is located behind the transmitter 10-2, and the pinhole 566 is located on a focal length of the Fourier lens 565. Through this configuration, the spatial filter spatially filters a beam passing through the transmitter 10-2 to obtain a phase distribution of the transmitter 10-2.

As such, the spatial filter including the Fourier lens 565 and the pinhole 566 located at a focal point of the Fourier lens is placed between the first photodetector 175 and the object 10 to spatially filter light passing through the object 10, and thus, a hologram including a phase distribution of the object 10 may be obtained.

According to an inline scanning holography system according to the present invention described above, a high-efficiency and high-quality optical scanning holography for a transmitter or a phosphor may be implemented by forming a scanning pattern in a single optical path by using a polarization sensitive lens, and in addition, there is an advantage in that the inline scanning holography system is robust and stable in an external environment by using an optical system structure with high stability and low complexity.

Although the present invention is described with reference to the embodiments illustrated in the drawings, which are merely examples, those skilled in the art will understand that various modifications and equivalent other embodiments may be made therefrom. Accordingly, the true technical protection scope of the present invention should be determined by the technical idea of the appended claims.

The invention claimed is:

1. An inline scanning holography system comprising:
    a linear polarization direction converter configured to provide a linearly polarized beam by changing a polarization direction with phase-delaying the linearly polarized beam incident from an outside;
    a signal generation unit configured to generate a phase modulation signal for varying a phase delay value with time and apply the phase modulation signal to the linear polarization direction converter;
    a collimator configured to expand the linearly polarized beam passing through the linear polarization direction converter;
    a polarization sensitive lens configured to receive the expanded linearly polarized beam from collimator and configured to generate a first spherical wave of right-handed circular polarized light having a negative focal length and a second spherical wave of left-handed circular polarized light having a positive focal length, wherein the collimator is located between the linear polarization director converter and the polarization sensitive lens, wherein the linear polarization direction converter is located at a front end of the polarization sensitive lens;
    a polarizer configured to pass only a beam component in a predetermined polarization direction therethrough among components of the generated first and second spherical waves;
    a scanning unit for scanning a phosphor that is a fluorescence object by using an interference beam generated between the first and second spherical waves passing through the polarizer; and
    a first photodetector configured to detect a fluorescent beam diverged from the phosphor.

2. The inline scanning holography system of claim 1, further comprising:
    a light transmission means for transferring the fluorescent beam of the phosphor to the first photodetector.

3. The inline scanning holography system of claim 2, wherein
    the light transmission means is a dichroic mirror, and
    the dichroic mirror is disposed between the scanning unit and the phosphor, transmits the interference beam incident by the scanning unit therethrough and transfers the interference beam to the phosphor, and reflects the fluorescent beam incident from the phosphor and transfers the fluorescent beam to the first photodetector.

4. The inline scanning holography system of claim 1, wherein the linear polarization direction converter comprises:
    a variable wave plate to which a phase modulation signal with a phase delay value varying with time is applied and which phase-delays the incident linearly polarized beam according to the phase modulation signal to vary polarization; and
    a quarter-wave plate configured to change polarization of a beam passing through the variable wave plate.

5. The inline scanning holography system of claim 4, wherein
    the variable wave plate is composed of a Pockels cell using an electrooptic effect for inducing a phase delay of a beam according to an electrical signal or a liquid crystal variable wave plate that changes a phase delay of a beam by changing a direction of a liquid crystal director according to an electrical signal.

6. The inline scanning holography system of claim 1, wherein
    the polarization sensitive lens is composed of a geometric phase lens.

7. The inline scanning holography system of claim 1, wherein
    the phase modulation signal is a periodic ramp signal with the phase delay value varying with time, and the interference beam has a form of a heterodyne-modulated nonlinear Fresnel zone plate with time and is defined by a following equation, $$I_{fzp}(x_0, y_0; z) = \cos\left[\frac{2\pi f_{gp}}{\lambda(2f_{gp} + z)z}(x_0^2 + y_0^2) + 2\Omega_0 t\right]$$

where, λ is a wavelength of a used beam, $f_{gp}$ is a focal length of the polarization sensitive lens, $(x_0^2+y_0^2)$ is a Catharsian coordinate system in which a plane orthogonal to an optical axis of the linearly polarized beam is set as $(x_0,y_0)$, z is a distance from a focal position of the second spherical wave to the object, and the periodic ramp signal according to time t has a slope of $\Omega_0$ and is represented as a function of $\Omega(t)=\Omega_0 t$ with a value between 0 and π.

8. The inline scanning holography system of claim 7, further comprising:
    an electronic processing unit configured to generate a hologram of the object by processing a signal detected by the first photodetector,
    wherein the signal generation unit generates Ω(t) which is the periodic ramp signal according to time to apply the periodic ramp signal to the linear polarization direction converter and generates sin ($2\Omega(t)$) which is a heterodyne reference signal to apply the heterodyne reference signal to a heterodyne detector included in the electronic processing unit.

* * * * *